United States Patent
Choo et al.

(10) Patent No.: US 8,581,798 B2
(45) Date of Patent: Nov. 12, 2013

(54) RADIO FREQUENCY IDENTIFICATION ANTENNA

(75) Inventors: Jae Yul Choo, Yongin-si (KR); Jin Kuk Hong, Hwaseong-si (KR); Jeong Ki Ryoo, Anyang-si (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 374 days.

(21) Appl. No.: 13/005,478

(22) Filed: Jan. 12, 2011

(65) Prior Publication Data
US 2011/0175785 A1    Jul. 21, 2011

(30) Foreign Application Priority Data

Jan. 20, 2010   (KR) .................. 10-2010-0005203

(51) Int. Cl.
*H01Q 9/16*    (2006.01)

(52) U.S. Cl.
USPC .................................... 343/822; 343/793

(58) Field of Classification Search
None
See application file for complete search history.

(56) References Cited

U.S. PATENT DOCUMENTS

| | | | |
|---|---|---|---|
| 7,659,863 B2 * | 2/2010 | Kai et al. | 343/795 |
| 7,750,862 B2 * | 7/2010 | Hilgers | 343/726 |
| 8,134,505 B2 * | 3/2012 | Yamagajo et al. | 343/700 MS |
| 2009/0033580 A1 | 2/2009 | Hozouri | |
| 2009/0096696 A1 * | 4/2009 | Joyce et al. | 343/793 |
| 2009/0295667 A1 * | 12/2009 | Ma et al. | 343/795 |
| 2010/0134292 A1 * | 6/2010 | Deavours | 340/572.7 |
| 2010/0156736 A1 * | 6/2010 | Chung et al. | 343/793 |
| 2010/0156737 A1 * | 6/2010 | Park et al. | 343/795 |

FOREIGN PATENT DOCUMENTS

| | | |
|---|---|---|
| CN | 101013771 | 8/2007 |
| CN | 101048786 | 10/2007 |
| EP | 1814190 | 8/2007 |
| EP | 1912284 | 4/2008 |
| JP | 2000-222540 | 8/2000 |
| JP | 2007-208536 | 8/2007 |
| JP | 2007-221735 | 8/2007 |
| JP | 2007-249620 | 9/2007 |
| WO | 2007/013168 | 2/2007 |
| WO | 2009/048767 | 4/2009 |
| WO | 2009073742 | 6/2009 |

OTHER PUBLICATIONS

The State Intellectual Property Office of the People's Republic of China Application Serial No. 201110026688.7, Office Action dated Mar. 29, 2013, 6 pages.
European Patent Office Application Serial No. 11151301.6, Search Report dated Apr. 4, 2011, 6 pages.

* cited by examiner

*Primary Examiner* — Trinh Dinh
(74) *Attorney, Agent, or Firm* — Lee, Hong, Degerman, Kang & Waimey (57) ABSTRACT

Disclosed herein is an RFID antenna, including, a dipole antenna pattern, and a matching pattern containing a pair of first pattern parts, each part being discretely and protrusively disposed at one side of the dipole antenna pattern and a second pattern part connecting each distal end of the pair of first pattern parts, wherein a ratio of an inner length of the pair of first pattern parts vs an inner length of the second pattern part is substantially larger than 1:8.

3 Claims, 7 Drawing Sheets

|  | XCODE T tag | XCODE Crab tag |
|---|---|---|
| TAG CHIP | Monza 3 | |
| 912 MHz CHIP IMPEDANCE | 15−j180 Ω | |
| MINIMUM POWER FOR CHIP DRIVING | −15 dBm | |
| TAG SIZE | 94 mm x 16 mm | 92 mm x 16 mm |
| MINIMUM TAG DRIVE POWER | −14.7 dBm ($\varepsilon_r$= 1.5) | −15.4 dBm ($\varepsilon_r$= 4.9) |
| MATERIAL BANDWIDTH | 9.70 ($\varepsilon_r$: 1.0 ~ 10.70) | 5.72 ($\varepsilon_r$: 1.0 ~ 6.72) |

(a)

|  | MINIMUM TAG DRIVE POWER (dBm) | | | | DIFFERENCE (dB) |
|---|---|---|---|---|---|
|  | FOAM (THICKNESS = 5 mm) | WOOD (THICKNESS = 8.4 mm) | FR4 (THICKNESS = 5 mm) | GLASS (THICKNESS = 4.8 mm) | |
| XCODE T tag | −13.79 | −15.42 | −15.72 | −13.87 | 1.93 |
| XCODE Crab tag | −15.82 | −15.25 | −15.26 | −15.75 | 0.57 |

RADIO FREQUENCY IDENTIFICATION ANTENNA

CROSS-REFERENCE TO RELATED APPLICATIONS

Pursuant to 35 U.S.C. §119(a), this application claims the benefit of earlier filing date and right of priority to Korean Application No. 10-2010-0005203, filed on Jan. 20, 2010, the contents of which are hereby incorporated by reference herein in their entirety.

BACKGROUND OF THE INVENTION

1. Field of the Invention

The present invention relates to an RFID antenna using a kind of radio recognition technology called Radio Frequency Identification (RFID).

2. Description of the Related Art

In general, an radio frequency identification (hereinafter, called 'RFID') technology refers to a solution of using a radio frequency signal and reading non-contact type data stored in price tags, labels, or credit cards embedded in a small semiconductor chip to identify an object.

Such an RFID technology collects, stores, processes and tracks information of each item from tags attached to items using a radio frequency signal, capable of providing various services such as item location determination (LD), remote processing, management and information exchange among items.

In recent times, methods and systems for managing inventory, warehousing/goods delivery and item-selling using an RFID technology are proposed. For example, by installing an RFID antenna on a product management shelf for stocking or displaying items, attaching tags to each item, and grasping the current state of each item, a great number of items can be efficiently managed.

Item management methods/systems using an RFID, at locations where flow of stocked items is frequent and there are large users, may be conveniently applied to libraries, or rental stores, clothing shops where items are relatively displayed on a steady base.

Of late, a market is progressively and gradually expanding towards an RFID application field using ultra-high frequency (UHF) band (300 MHz~3 GHz).

An RFID system of UHF band has an advantage in that it is capable of a tag recognition at a long recognition distance of more than 5 m, and it also has a very high recognition speed and a recognition ratio at a near-distance of less than 50 cm compared to that of HF band.

In such an RFID system of the UHF band, a farfield is mainly formed as an electric field, enabling tag recognition at a long distance, but it is sensitive to a surrounding environment because of being operated by back-scattering.

In an RFID system of UHF band, a nearfield is mainly formed as a magnetic field and operated by a coupling, and thus scarcely subject to an impact of materials having a high permittivity such as water or metal substances. As a result, an RFID reader advantageously has a high tag recognition ratio and is also fast in a recognition speed.

SUMMARY OF THE INVENTION

The present invention provides an RFID antenna insusceptible to permittivity.

An RFID antenna according to the present invention includes, a dipole antenna pattern, and a matching pattern containing a pair of first pattern parts, each part being discretely and protrusively disposed at one side of the dipole antenna pattern and a second pattern part connecting each distal end of the pair of first pattern parts, wherein a ratio of an inner length of the pair of first pattern parts vs an inner length of the second pattern part is substantially larger than 1:8.

In some exemplary embodiments, the inner length of the second pattern part is a length of a straight line between two inner points connecting the pair of first pattern parts and the second pattern part, and the inner length of the pair of first pattern parts is a length between the dipole antenna pattern and the second pattern part.

In some exemplary embodiments, the inner length (YT) of the pair of first pattern parts is computed by Equation 1 and the inner length (XT) of the second pattern part is computed by Equation 2.

$$Y_T = Y_{CTC} - Y_D/2 - W_T/2 \qquad \text{Equation 1}$$

$$X_T = \frac{2}{k}\arctan\left[\left(\frac{(1+\alpha)^2 Z_D}{\frac{2(1+\alpha)^2 Z_D}{Z_{Ant}} - 2}\right)\frac{1}{jZ_0}\right] \qquad \text{Equation 2}$$

where $$\alpha = \frac{\log_e\left(\frac{Y_{CTC}}{W'_T}\right)}{\log_e\left(\frac{Y_{CTC}}{Y'_D}\right)},$$

K is $2\pi/\lambda$, $Z_{Ant}$ is an impedance of the RFID antenna, $Z_D$ is an impedance of the dipole antenna pattern, and $Z_0$ is a characteristic impedance, $Y_{CTC}$ is a length between a center line of the dipole antenna pattern and a center line of the second pattern part, $Y_D$ is a vertical length of the dipole antenna pattern, $W_T$ is a width of the second pattern part, $W'_T=0.25 W_T$, and $Y'_D=0.25 Y_D$.

In some exemplary embodiments, the pair of the first pattern parts is obliquely slanted such that a length between two inner points connecting the pair of first pattern parts and the dipole antenna pattern is longer than the inner length of the second pattern part.

In some exemplary embodiments, the second pattern part is a curved shape.

Another RFID antenna according to the present invention includes, a dipole antenna pattern and a matching pattern containing a pair of first pattern parts, each part being discretely and protrusively disposed at one side of the dipole antenna pattern and a second pattern part connecting each distal end of the pair of first pattern parts, wherein a ratio of an inner length of the pair of first pattern parts vs an inner length of the second pattern part is substantially larger than 70:1.

Pursuant to the invention, also in a case a dielectric changes according to alteration of attached materials, a tag may normally operate with less impact of a dielectric change.

DETAILED DESCRIPTION OF THE INVENTION

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

Figure 1:
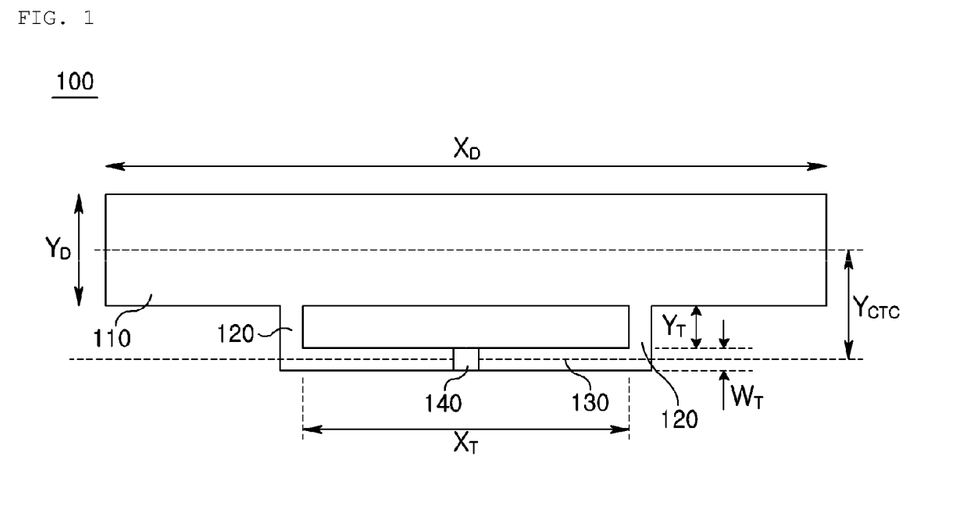
FIG. 1 is a plan view of an RFID antenna according to a first embodiment of the preset invention.

FIG. 1 is a plan view of an RFID antenna according to a first embodiment of the present invention.

Referring to FIG. 1, an RFID antenna 100 includes a dipole antenna pattern 110 and a matching pattern. The matching pattern includes a pair of first pattern parts 120 and a second pattern part 130. An RFID tag includes the RFID antenna 100 and a tag chip 140.

The dipole antenna pattern 110 receives a radio frequency signal sent out from an RFID reader. The dipole antenna 110 is a radiator, composed of materials with conductivity. As conductive materials, a conductive ink or a pure metal such as Cu, Cu alloy, or aluminum may be used. The dipole antenna 110 may include a pair of patterns symmetrical at both end parts. A specific description related to this will be described with reference to a later-described FIG. 5a.

The matching pattern is constructed to match impedance between the dipole antenna 110 and the tag chip 140. When the impedance is matched, a signal received through the dipole antenna 110 is all delivered to the tag chip 140 through the matching pattern. In addition, a signal outputted from the tag chip 140 is all delivered to the dipole antenna 110 through the matching pattern.

The tag chip 140 may bond to the second pattern 130 by using a medium such as an anisotropy conductive film, anisotropy conductive glue and an isotropy conductive film, or by using isotropy conductive glue, or by an ultrasonic accretion method, or by wire bonding. A position of the tag chip 140 is not limited to said position, but a variety of changes are possible.

The dipole antenna pattern 110, the matching pattern and the tag chip 140 may be formed on a substrate.

In FIG. 1, XD is a longitudinal length of the dipole antenna pattern 110, and YD is a vertical length of the dipole antenna pattern 110. XT is an inner length of the second pattern part 130, YT is an inner length of the first pattern parts 120. The inner length (XT) of the second pattern part 130 is a length of a straight line between two inner points connecting the first pattern parts 120 and the second pattern part 130. The inner length of the first pattern parts 120 is a length between the dipole antenna pattern 110 and the second pattern part 130.

WT is a width of the second pattern part 130, and YCTC is a length from a center line of the dipole antenna pattern 110 to a center line of the second pattern part 130. The parameters (XD, YD, XT, YT, WT, YCTC) are used at a later-described FIG. 2 and equations.

Figure 2:
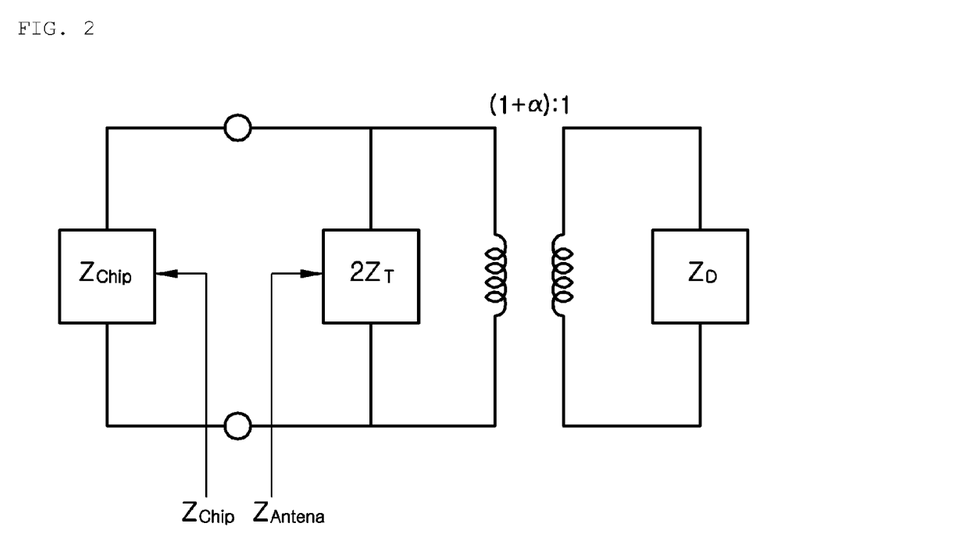
FIG. 2 is a diagram indicating an RFID antenna of FIG. 1 as an equivalent circuit.

FIG. 2 is a diagram indicating an RFID antenna of FIG. 1 as an equivalent circuit;

Referring to FIG. 2, Zchip is an impedance of the tag chip 140, ZT is an impedance of short stub with a length being XT, and ZD is an impedance of the dipole antenna pattern 110. A coupling coefficient (α) is obtained by following [Equation 2].

Hereinafter, based on the equivalent circuit and the parameters (XD, YD, XT, YT, WT, YCTC), equations related to RFID antennas according to the present embodiment will be derived.

The following Equation 1 is an equation for calculating power (PChip) delivered to the tag chip 140.

$$P_{Chip} = P_{Ant}(1 - |\eta_{tag}|^2) = p_{Ant}\left(1 - \left|\frac{Z_{Ant} - Z^*_{Chip}}{Z_{Ant} - Z_{Chip}}\right|^2\right) \quad \text{[Equation 1]}$$

where $P_{Chip}$ is power delivered to the tag chip 140, and $P_{Ant}$ is power delivered to an RFID antenna 100. $\eta_{tag}$ is a reflective coefficient of the tag chip 140, $Z_{Ant}$ is an impedance of the RFID antenna 100, and $Z_{Chip}$ means an impedance of the tag chip 140. Through Equation 1, power delivered to the tag chip 140 can be computed.

The following [Equation 2] is an equation for calculating maximum power transfer conditions.

$$Z_{Ant} = Z^*_{Chip} = \frac{2Z_T[(1+\alpha)^2 Z_D]}{2Z_T + (1+\alpha)^2 Z_D}, \quad \alpha = \frac{\log_e\left(\frac{Y_{CTC}}{W'_T}\right)}{\log_e\left(\frac{Y_{CTC}}{Y'_D}\right)} \quad \text{[Equation 2]}$$

Where ZAnt is an impedance of the RFID antenna 100, ZChip is an impedance of the tag chip 140, ZT is an impedance of short stub with the length being XT, and ZD means an impedance of the dipole antenna pattern 110. Also, YCTC means a length from a center line of the dipole antenna pattern 110 to a center line of the second pattern part 130, $W'_T=0.25W_T$, and $Y'_D=0.25Y_D$. α is a coupling coefficient in the equivalent circuit, and α is computed by a physical dimension of the matching pattern and that of the dipole antenna pattern 110.

Through the [Equation 2], a maximum power transfer condition may be calculated.

The following [Equation 3] is an equation for calculating ZT.

$$Z_T = jZ_0\tan\left(\frac{KX_T}{2}\right) \quad \text{[Equation 3]}$$

Where $$Z_0 = 276\log_{10}\left(\frac{Y_{CTC}}{\sqrt{W'_T Y'_D}}\right)$$

Herein, K is 2π/λ, XT is the inner length of the second pattern part 130, YT is the inner length of the first pattern parts 120, and Z0 means a characteristic impedance. Through the equation 3, ZT may be calculated.

The following [Equation 4] is an equation for computing XT. [Equation 4] is a formula expressing relative to XT, in which [Equation 3] substituted with [Equation 2].

$$X_T = \frac{2}{k}\arctan\left[\left\{\frac{(1+\alpha)^2 Z_D}{\frac{2(1+\alpha)^2 Z_D}{Z_{Ant}} - 2}\right\}\frac{1}{jZ_0}\right] \quad \text{[Equation 4]}$$

The following [Equation 5] is a formula expressing relative to XT with a different parameter from Equation 4.

$$X_T = \frac{2}{k}\arctan\left[\left\{\frac{(1+\alpha)^2 Z_D}{\frac{2(1+\alpha)^2 Z_D}{Z_{Chip}^*} - 2}\right\}\frac{1}{jZ_0}\right] \quad \text{[Equation 5]}$$

The coupling coefficient, α, includes YCTC parameter and YCTC=YD/2+YT+WT/2. From this, an equation related to YT may be obtained.

Figure 3:
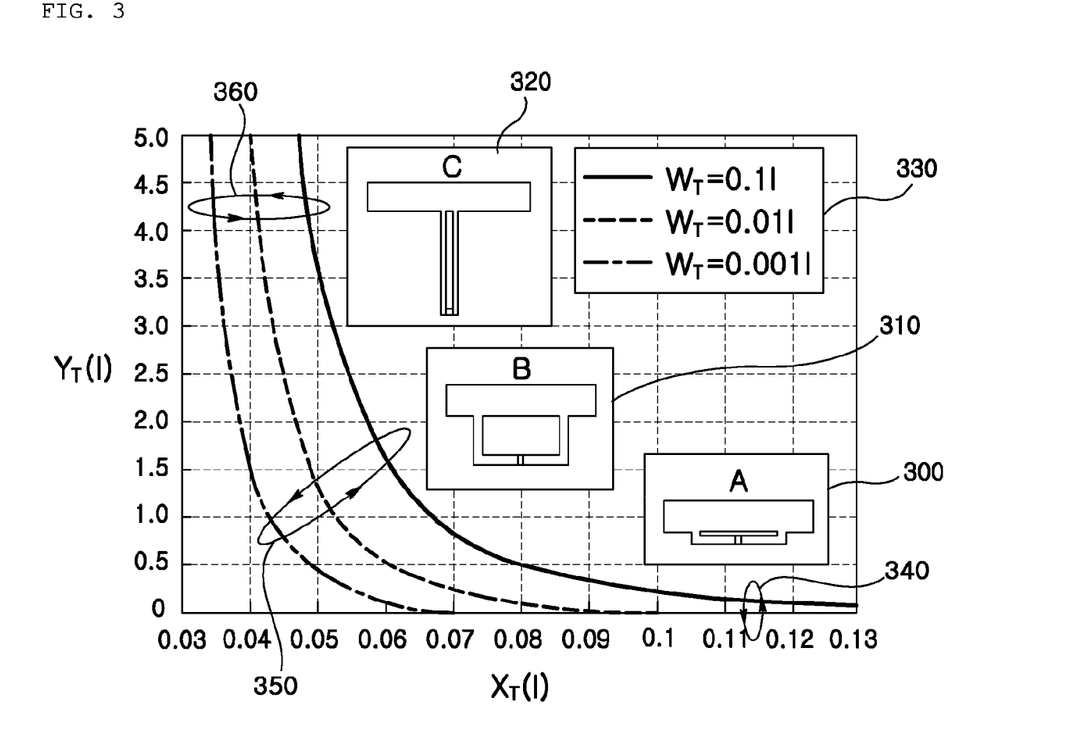
FIG. 3 is a graph showing a relationship of XT, YT and WT based on equations.

FIG. 3 is a graph showing a relationship of XT, YT and WT based on equations.

Referring to FIG. 3, the illustrated graph is one connecting points making an optimal complex conjugate matching according to the change of XT, YT and WT. Herein, values of parameters except the XT, YT and WT are a predetermined value. A longitudinal axis of FIG. 3 is a length of XT, a vertical axis is a length of YT, and WT indicates a width of the second pattern part 130. In FIG. 3, the letter l means a wavelength λ. For example, 0.06 in the longitudinal axis means 0.06*λ. When λ is 30 cm, XT is obtained as 0.06*30 cm=1.8 cm. The remaining parameters may be applied in a same way.

In a case an RFID antenna 100 is A-type 300, a current direction flowing through a matching pattern is mainly a longitudinal direction. Thus, when the RFID antenna 100 is attached to a specific object, thus influenced by dielectrics under the influence of dielectrics by being attached to a specific object, an electrical length of a longitudinal direction of the matching pattern is changed. In a case the RFID antenna 100 is A type, as expressed in the graph 340, it can be known that XT value changes lengthwise relative to changed YT, but YT is infinitesimally changed relative to changed XT. That is, for complex conjugate matching, in that an RFID antenna of A type has a short range of YT, and has a wide range of XT, it does have a considerably blunt characteristic relative to an electrical length change of the longitudinal direction. In particular, in a case a ratio of an inner length (YT) of the first pattern parts 120 vs an inner length (XT) of the second pattern part 130 is more than 1:8, a blunter characteristic is shown. And thus, a tag according to the present embodiment may stably operate even in the change of dielectrics.

In a case an RFID antenna 100 is B type 310, a current direction flowing through a matching pattern becomes a vertical direction and a longitudinal direction. Thus, in a case the RFID antenna 100 is attached to a specific object, thus affected by dielectrics, an electrical length of a vertical direction and a longitudinal direction of the matching pattern changes. And thus, in case an antenna of B type 310 has a sensitive characteristic 350 relative to an electric length change of both the vertical direction and the longitudinal direction.

Figure 6:
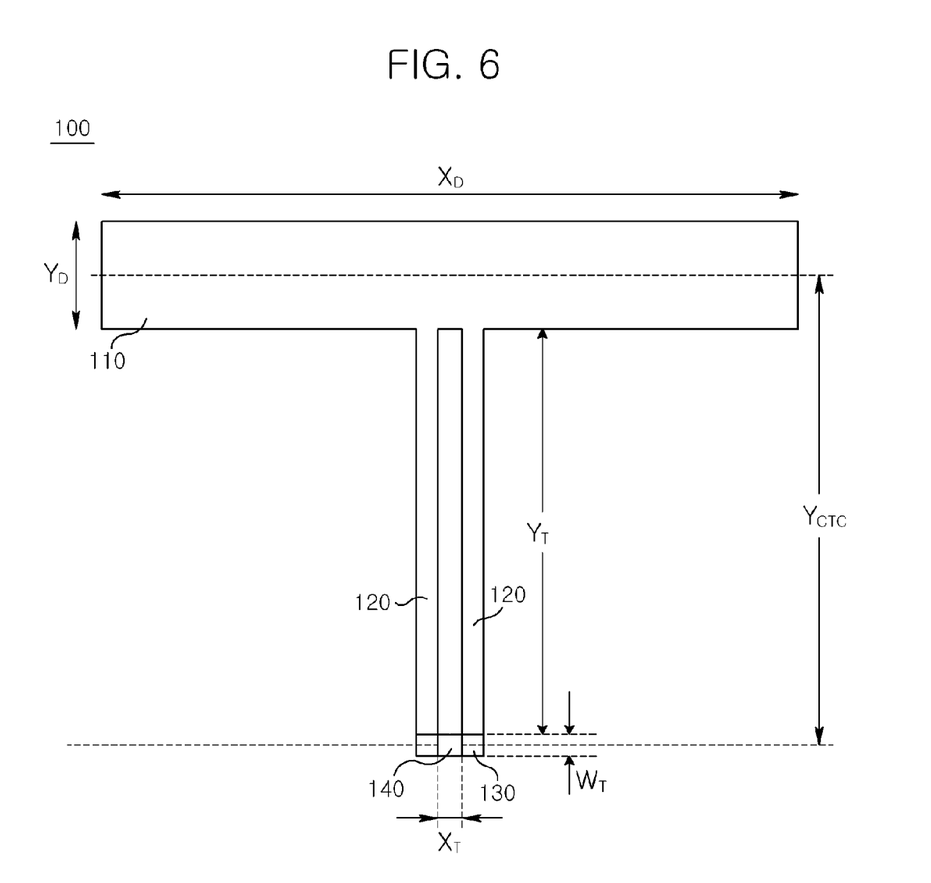
FIG. 6 is a plan view of an RFID antenna according to an embodiment of the present invention.

In case an RFID antenna 100 is C type 320, a current direction flowing through a matching pattern mainly becomes a vertical direction. Thus, in case the RFID antenna 100 is attached to a specific object, thus affected by dielectrics, an electric length of a vertical direction of the matching pattern changes. Expressed in the graph 360, it can be known that YT drastically changes relative to changed XT, but XT nearly dispenses with a change relative to changed YT. That is, for complex conjugate matching, in that an antenna of C type has a short range of XT and a wide range of YT, it does have a considerably blunt characteristic to an electric length change of the vertical direction. In particular, in case a ratio of an inner length (YT) of the first pattern parts 120 vs an inner length (XT) of the second pattern part 130 is more than 70:1 (see, for example, FIG. 6), a blunter characteristic is shown. And thus, a tag according to the present embodiment may be stably operated even in case of change of dielectrics.

And thus, an antenna of A type or C type may be stably operated even in case of change of a dielectric.

Figure 4:
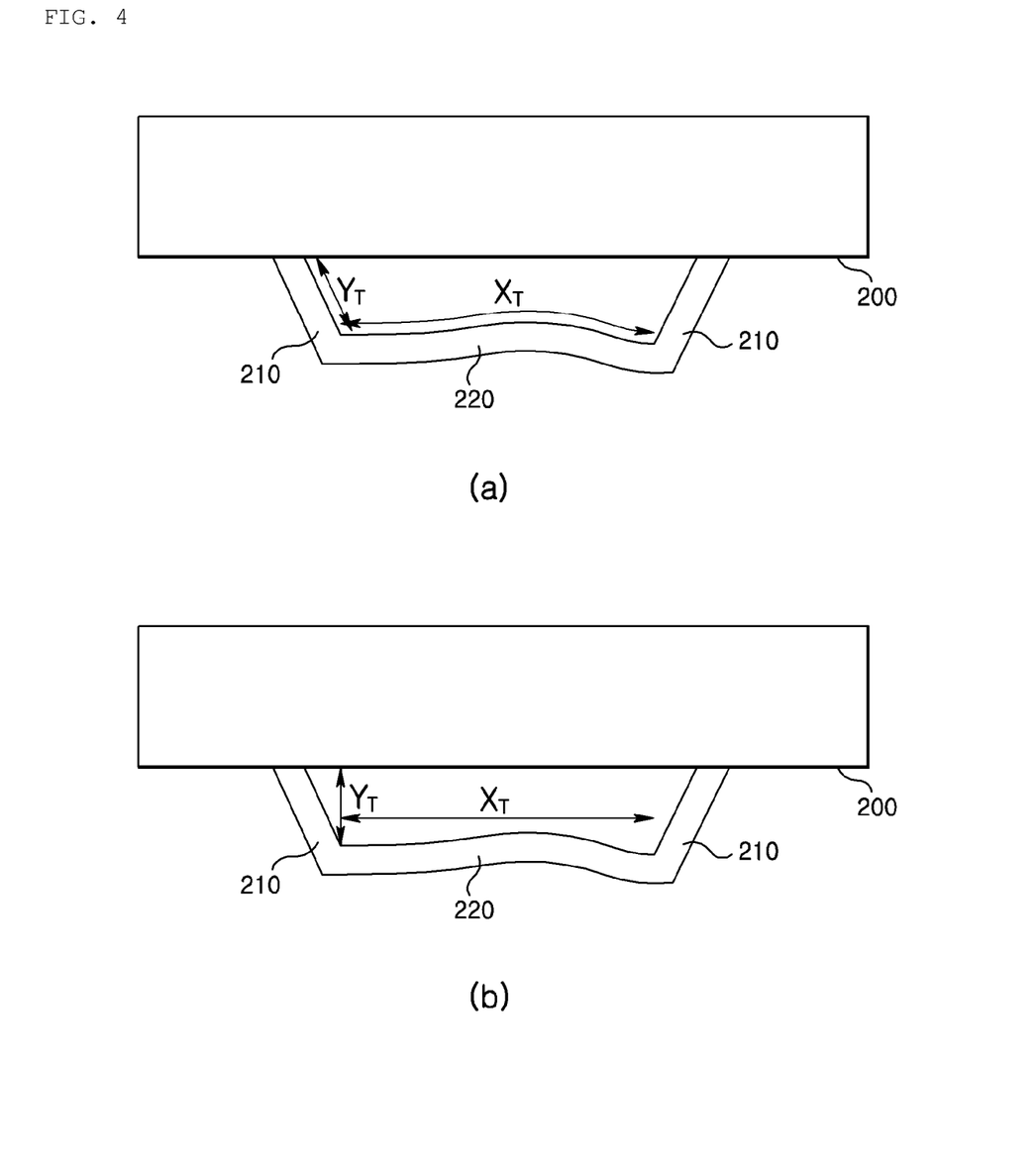
FIG. 4 is a plan view of an RFID antenna according to a second embodiment of the present invention.

FIG. 4 is a planar view of an RFID antenna according to a second embodiment of the present invention.

Specifically, FIG. 4 is a diagram for describing an inner length (XT) of a second pattern part 220 and an inner length (YT) of a first pattern part 210, in case an RFID antenna has a different pattern from a first embodiment As shown in (a) of FIG. 4, in a case a pair of first pattern parts 210 is slanted and a second pattern part 220 has a curve, XT means a length formed along inner line of the second pattern part 220, and YT means a length formed along inner line of the first pattern part 210. Based on the determined XT and YT, procedures of FIGS. 1 through 3 may be practiced. Related to this, a similar result to FIG. 3 can be obtained.

As shown in (b) of FIG. 4, the pair of first pattern parts 210 is slanted and the second pattern part 220 has a curve, XT means a length between the pair of first pattern parts 210, and YT means a length between the dipole antenna pattern 200 and the second pattern part 220. Based on the determined XT and YT, procedures of FIGS. 1 through 3 may be practiced. Related to this, a similar result to FIG. 3 can be obtained.

As such, XT and YT may vary differently, according to a shape of antennas.

Figure 5A:
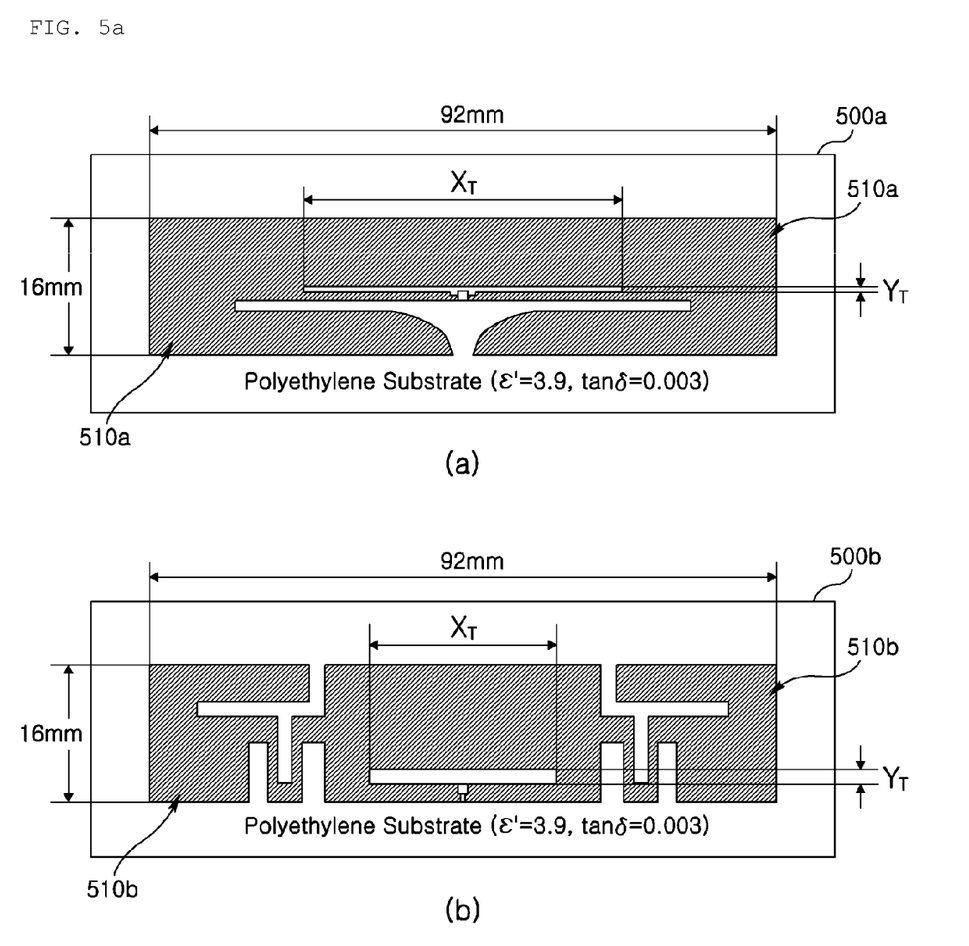
FIGS. 5a through 5c are diagrams showing an RFID tag applied with an RFID antenna according to a first embodiment of the present invention and simulation results relative to the RFID tag.
Figure 5B:
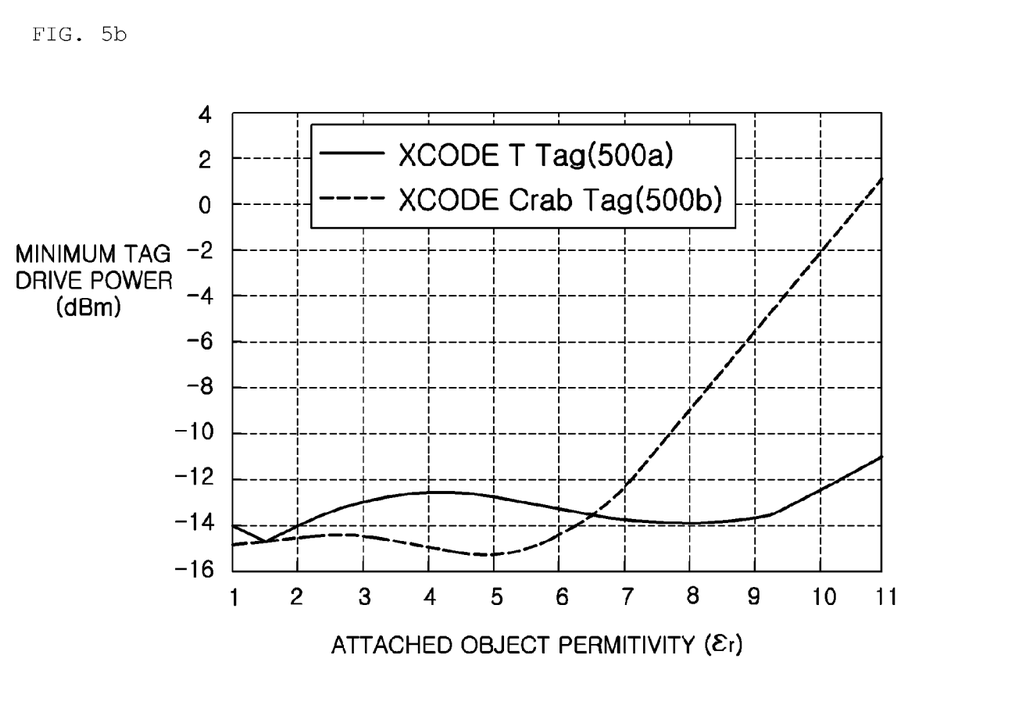
Figure 5C:
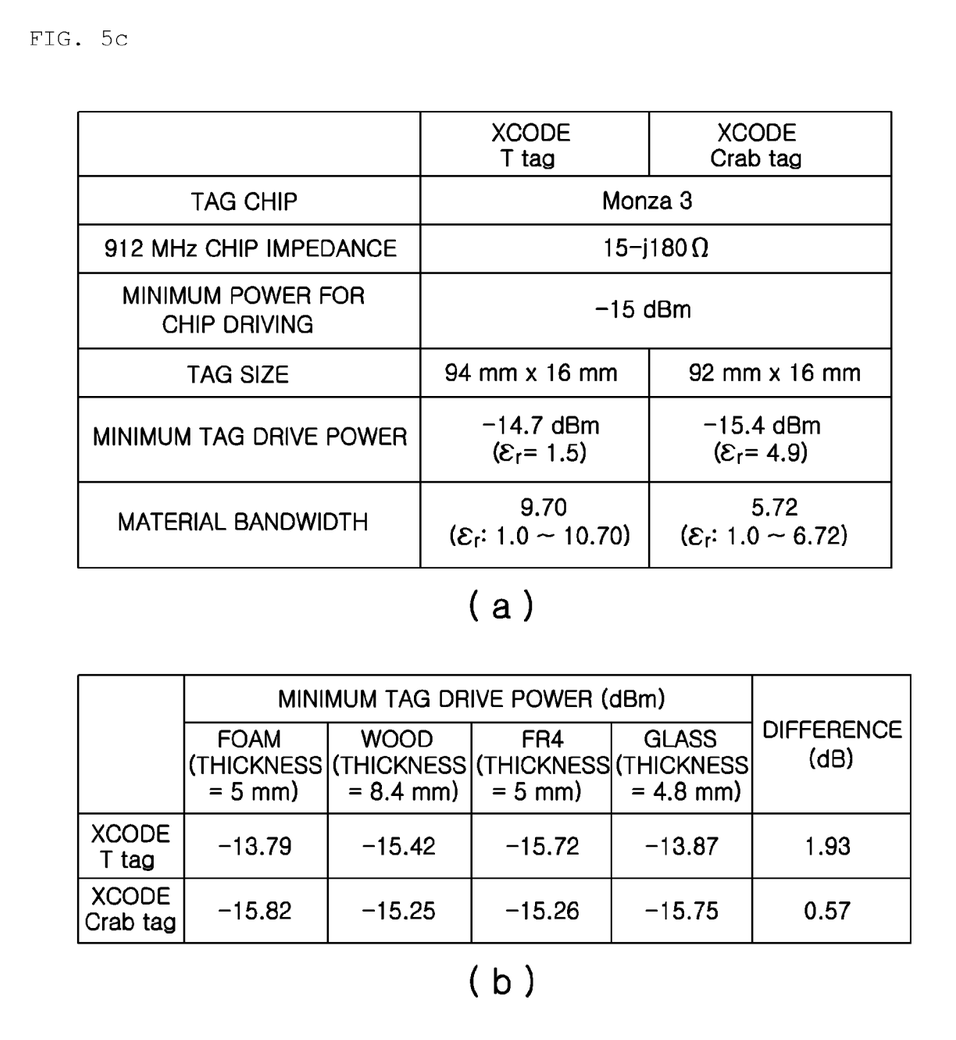

FIGS. 5a through 5c are diagrams showing an RFID tag applied with an RFID antenna according to a first embodiment of the present invention and simulation results relative to the RFID tag.

(a) and (b) of FIG. 5a are planar views of the RFID tag including an antenna with A type of FIG. 3. Each of a first tag 500a and a second tag 500b includes an antenna with A type printed on a substrate and a tag chip. Hereinafter, simulation results based on the two tags are explained. The first tag 500a and the second tag 500b include a pair of patterns 510a, 510b symmetric at both end parts of an RFID antenna 100. A shape of the pair of patterns 510a, 510b is by way of one example, various changes are possible. That is, as illustrated in FIG. 5a, once a space created by the XT and YT exists, it does not matter that a shape of other parts is composed of any form.

FIG. 5b is a graph showing a minimum tag drive power computed based on the following [Equations 6 and 7] with respect to the first tag 500a and the second tag 500b.

The following [Equations 6 and 7] are equations for calculating minimum tag drive power Ptagmin.

$$P_{tag\,min} = \frac{P_{chip\,min}}{(1 - \eta_{tag}^2)Eff_{tag}D_{tag}} \quad \text{[Equation 6]}$$

Herein, Pchipmin is minimum drive power of a tag chip, $\eta_{tag}$ is reflective coefficient of a tag, Efftag is an antenna radiation efficiency of a tag, and Dtag means diversity of a tag. Through this, minimum tag drive power Ptagmin value may be computed.

$$P_{tag\ min} = \frac{P_{min}(1-\eta_{reader}^2)Eff_{reader}D_{reader}}{\left(R_{fixed}\frac{4\pi}{\lambda}\right)^2} \quad \text{[Equation 7]}$$

where $P_{min}$ is a minimum sending power of a reader, $\eta_{reader}$ is reflective coefficient of a reader, $Eff_{reader}$ is antenna radiation efficiency of a reader, $D_{reader}$ is diversity of a reader, and $R_{fixed}$ means a distance between an antenna of a reader and a tag. Through this minimum tag drive power $P_{tagmin}$ value may be computed.

A longitudinal axis of the graph of FIG. 5b is permittivity of an attached object, and a vertical axis is minimum tag drive power.

Referring to the graph of FIG. 5b, in even when permittivity of the attached object is changed, it can be known that a change of minimum tag drive power the first tag (XCODE T tag, 500a) is unobservable. This shows that the first tag 500a normally operates as being attached to any object. In the second tag (XCODE Crab tag, 500b), it can be known that a change of minimum tag drive power is nearly infinitesimal when permittivity of an object is less than 7. This shows that the second tag 500b normally operates as being attached to any object with permittivity less than 7.

FIG. 5c is a table arranging parameters calculated using the first tag 500a and the second tag 500b, and parameters obtained through an actual test.

(a) of FIG. 5c is a table arranging parameters calculated using the first tag 500a and the second tag 500b. Herein, material bandwidth is defined like the following [Equation 8].

Material bandwidth(MB)=Maximum $\in_r$-Minimum $\in_r$     [Equation 8]

Referring to (a) of the FIG. 5c, the two tags 500a, 500b has higher material bandwidth (a first tag is 9.7, and a second tag is 5.7) over material bandwidth (generally, 2.1) of other general tags. This means that the two tags 500a, 500b have blunt characteristics relative to change of dielectrics. In other words, even in case of changing dielectrics, it can be known that the two tags 500a, 500b may operate normally with small influence thereof.

(b) of the FIG. 5c is a table arranging a measured minimum tag drive power where a tag is actually attached to an object.

Referring to (b) of the FIG. 5c, a similar result to the calculated parameters in (a) of the FIG. 5c may be obtained. That is, it can be known that a difference (dB) of each of the two tags 500a, 500b is minimal (a first tag is 1.93, and a second tag is 0.57) compared to other general tags (about 2.21). This means that a change in minimum tag drive power of the two tags 500a, 500b is very small even in adhering to attached objects with a different permittivity. Thus, even in case of changing dielectrics, it can be known that the two tags 500a, 500b may operate normally without small influence therefrom.

While the present invention has been described in detail through representative embodiments in the above part, it is noted that the described embodiment is for the description itself, and not in a limiting purpose. Also, it would be understood to those skilled in the art that various modifications can be made in the described embodiment without departing from the scope of the present invention.

What is claimed is:

1. A Radio Frequency Identification (RFID) antenna comprising:
   a dipole antenna pattern; and
   a matching pattern configured to match impedance between the dipole antenna pattern and a tag chip, the matching pattern comprising a pair of first patterns and a second pattern, each of the first patterns extending vertically from the dipole antenna pattern, and the second pattern connecting each end of the pair of first patterns to form a loop,
   wherein a height of the loop is at least seventy times longer than a width of the loop, the width of the loop including a length between the pair of first patterns and the height of the loop including a length between the dipole antenna pattern and the second pattern.

2. The RFID antenna of claim 1, wherein the pair of first patterns is tilted so that the loop increasingly narrows toward the second pattern.

3. The RFID antenna of claim 1, wherein the second pattern includes a curved shape.

* * * * *